United States Patent
Pehu-Lehtonen et al.

(10) Patent No.: US 12,054,886 B2
(45) Date of Patent: Aug. 6, 2024

(54) METHOD FOR PRODUCING OXIDIZED LIGNIN IN KRAFT PULP MILL

(71) Applicants: Andritz Oy, Helsinki (FI); Metsä Fibre Oy, Metsä (FI); Teknologian tutkimuskeskus VTT Oy, Espoo (FI)

(72) Inventors: Lauri Pehu-Lehtonen, Helsinki (FI); Pauliina Sjögård, Helsinki (FI); Outi Poukka, Metsä (FI); Katariina Kemppainen, Metsä (FI); Anna Kalliola, Espoo (FI); Tiina Liitiä, Espoo (FI); Tapio Vehmas, Espoo (FI)

(73) Assignees: Andritz Oy, Helsinki (FI); Metsä Fibre Oy, Metsä (FI); Teknologian tutkimuskeskus VTT Oy, Espoo (FI)

( * ) Notice: Subject to any disclaimer, the term of this patent is extended or adjusted under 35 U.S.C. 154(b) by 407 days.

(21) Appl. No.: 17/427,700

(22) PCT Filed: Jan. 31, 2020

(86) PCT No.: PCT/FI2020/050057
§ 371 (c)(1),
(2) Date: Aug. 2, 2021

(87) PCT Pub. No.: WO2020/157386
PCT Pub. Date: Aug. 6, 2020

(65) Prior Publication Data
US 2022/0120035 A1    Apr. 21, 2022

(30) Foreign Application Priority Data
Feb. 1, 2019  (FI) .................. 20195065

(51) Int. Cl.
D21C 11/00 (2006.01)
C08H 7/00 (2011.01)
D21H 11/04 (2006.01)

(52) U.S. Cl.
CPC ........... D21C 11/0007 (2013.01); C08H 6/00 (2013.01); D21C 11/0042 (2013.01); D21C 11/0057 (2013.01); D21H 11/04 (2013.01)

(58) Field of Classification Search
CPC ......... D21C 11/0007; D21C 11/00042; D21C 11/0057; D21C 11/0042; C08H 6/00
See application file for complete search history.

(56) References Cited

U.S. PATENT DOCUMENTS

| | | | |
|---|---|---|---|
| 3,726,850 A | | 4/1973 | Detroit |
| 3,910,873 A | * | 10/1975 | Lin .................. C08H 6/00 516/47 |

(Continued)

FOREIGN PATENT DOCUMENTS

| | | | |
|---|---|---|---|
| CA | 1335976 C | 6/1995 | |
| CA | 3017991 A1 | * 10/2017 | ........... C07C 303/06 |

(Continued)

OTHER PUBLICATIONS

Mota et al., Downstream processing of an oxidized industrial kraft liquor by membrane fractionation for vanillin and syringaldehyde recovery, Jan. 2018, Separation and Purification Technology, 197, 360-371 (Year: 2018).*

(Continued)

*Primary Examiner* — Anthony Calandra
(74) *Attorney, Agent, or Firm* — Laine IP Oy (57) ABSTRACT

According to an example aspect of the present invention, there is provided a method for producing an oxidised lignin based high performance surface active agent in techno-economically feasible manner within kraft pulp mill without interfering the main process.

15 Claims, 5 Drawing Sheets

(56) References Cited

U.S. PATENT DOCUMENTS 4,977,227 A     12/1990   Negami et al.
9,139,606 B2 *   9/2015   Miettinen ................ B01J 3/042

FOREIGN PATENT DOCUMENTS

| | | | |
|---|---|---|---|
| EP | 543135 A1 * | 5/1993 | ......... D21C 11/0057 |
| JP | 2001281803 A | 10/2001 | |
| JP | 2017510479 A | 4/2017 | |
| JP | 2017155008 A | 9/2017 | |
| RU | 2071518 C1 | 1/1997 | |
| RU | 2078755 C1 | 5/1997 | |
| RU | 2567352 C2 | 11/2015 | |
| WO | WO2007065241 A1 | 6/2007 | |
| WO | WO2008079072 A1 | 7/2008 | |
| WO | WO2009104995 A1 | 8/2009 | |
| WO | WO2010104458 A1 | 9/2010 | |
| WO | WO2011061399 A1 | 5/2011 | |
| WO | WO2012127111 A1 | 9/2012 | |
| WO | WO-2013173316 A1 * | 11/2013 | ............... C08H 6/00 |
| WO | WO2015049424 A1 | 4/2015 | |
| WO | WO2016080895 A1 | 5/2016 | |
| WO | WO2016165023 A1 | 10/2016 | |
| WO | WO2017077198 A1 | 5/2017 | |
| WO | WO2018161165 A1 | 9/2018 | |
| WO | WO2018205021 A1 | 11/2018 | |

OTHER PUBLICATIONS

Servaes et al: Purification and concentration of lignin from the spent liquor of the alkaline oxidation of woody biomass through membrane separation technology. Industrial Crops and Products, Oct. 2017, vol. 106, pp. 86-96.

Wan Jinquan: Introduction to environmental engineering in paper industry. Bejing: China Light Industry Press, Aug. 2005, p. 203.

* cited by examiner

METHOD FOR PRODUCING OXIDIZED LIGNIN IN KRAFT PULP MILL

FIELD

The present invention relates to a method for producing oxidized lignin in kraft pulp mill in an industrially feasible manner.

BACKGROUND

Dispersants are applied in many processes and products to enhance the product processability and product characteristic/performance as well as to reduce the production costs. Anionic dispersants cover the majority of the dispersant market. Concrete plasticizers are anionic dispersants that disperse cement particles to allow good workability of fresh concrete and ensure good strength properties of the final product (matured concrete). Similarly, anionic dispersant are used in preparing for example paints and coatings containing high portion of different inorganic pigments. Lignosulphonates from the sulphite pulping have served the marked as bio-based concrete plasticizers and dispersants. Typically, the performance of lignosulfonates is clearly lower than that of synthetic plasticizers/dispersants. Synthetic superplasticizer products include, for example sulfonated naphthalene formaldehyde condensates or polycarboxylate ether based co-polymers. Polyacrylic acids serve as typical anionic dispersants for pigments in paint and coatings.

Simple and cost-efficient alkali-$O_2$ oxidation method solubilizes technical lignins using $O_2$ under alkaline conditions where after they can be used as surface active agents, like dispersants for several end-uses to enhance the processability and product quality. The oxidized kraft lignins have shown to be better plasticizers and dispersants than lignosulfonate products or even some of the synthetic products. However, feasible industrial process concept for production of kraft lignin based surface active agents that can be integrated into kraft pulp mill without interfering the chemical balance of the main process has not yet been fully optimized/investigated.

Bio-based surface active agents, such as dispersants, with high performance are needed in many applications. Simultaneously, kraft pulp companies are intensively looking for possibilities to valorize lignin, the major process by-product, to enhance the incomes of their business. In order to provide decent profit margins, feasible production of new kraft lignin based surface active agents with high performance should be ensured. Especially, if being integrated into the pulp mill, the production of new lignin products should not interfere the existing pulp production and chemical balance.

The typical lignin precipitation results in severe problems with Na/S balance in the modern pulp mill with closed chemical circulation and low emissions. After $CO_2$ precipitation, the unwashed kraft lignin contains compounds from black liquor which consumes sulphuric acid in the following stage. This increases sulphur content in the chemical circulation. This excess sulphur has to be eliminated from the chemical circulation. The common way is to take out the electrostatic precipitator dust (ESP) from the recovery boiler, which contains mainly $Na_2SO_4$ and also typically 8-20% $Na_2CO_3$. There is therefore a significant loss of the sodium in the chemical circulation. For compensation, make-up NaOH must be added into chemical circulation, which is even more significant cost factor than the cost of the sulphuric acid.

Plasticizers should provide good workability and flow properties without any side effects in the cementitious material. Small organic acids (formed during oxidation and carry-over of unwashed kraft lignin) may cause for example retardation of cement hydration. Alkali-$O_2$ oxidized lignins have previously shown to be efficient plasticizers for concrete (WO 2015/049424 A1) and dispersants for many inorganic pigments (WO 2017/077198 A1). These disclosures do not however disclose the combination of the unit operations of the present invention, which are designed for a techno-economically improved lignin oxidation process concept, enabling integration into the kraft pulp mill without interfering the main process.

There is thus a need for a feasible industrial production of kraft lignin based surface active agents.

The project leading to this application has received funding from the Bio Based Industries Joint Undertaking under the European Union's Horizon 2020 research and innovation programme under grant agreement No 745246.

SUMMARY OF THE INVENTION

The invention is defined by the features of the independent claims. Some specific embodiments are defined in the dependent claims.

According to an aspect of the present invention, there is provided a method for producing oxidized lignin in kraft pulp mill.

According to a further aspect of the present invention, there is provided a feasible industrial production process of kraft lignin based high-performance surface agents within kraft pulp mill.

These and other aspects, together with the advantages thereof over known solutions are achieved by the present invention, as hereinafter described and claimed.

The method of the present invention is mainly characterized by what is stated in the characterizing part of claim 1.

Considerable advantages are obtained by means of the invention. More precisely, the present invention provides a process concept for oxidizing unwashed kraft lignin at alkaline conditions partly using oxidized white liquor (OWL) or white liquor (WL), and further post-treating the oxidized lignin in kraft pulp mill by filtration to produce high-performance surface active agents. The process concept allows feasible production of kraft lignin based surface active agents by enabling its integration into kraft pulp mill. The process concept provides several benefits for lignin isolation process, for the following lignin oxidation process, and for the final oxidized lignin product serving primarily as a high-performance concrete plasticizer or dispersant, but also more widely as any other type of surface active agent.

Next, the present technology will be described more closely with reference to certain specific embodiments.

EMBODIMENTS

The present technology provides a process concept for oxidizing unwashed kraft lignin at alkaline conditions by using OWL (or WL) and further post-treating the oxidized lignin in kraft pulp mill by membrane filtration to produce high-performance surface active agents. The concept allows feasible production of kraft lignin based surface active agents by enabling its integration into kraft pulp mill without interfering the main process, but also providing clear cost savings and environmental benefits.

The present invention works when most of the given features of the process concept described herein are applied in order to produce a lignin-based surface active agents in kraft pulp mill.

According to one embodiment of the present invention, the method comprises at least the steps of:
   isolating unwashed kraft lignin from kraft pulp mill,
   dissolving the unwashed kraft lignin in oxidized or un-oxidized white liquor to obtain a lignin solution,
   oxidizing the lignin solution at alkaline conditions with
      a) $O_2$ gas over pressure, and
      b) introducing NaOH and/or oxidized white liquor as an alternative alkali source during the oxidation
   treating the oxidized lignin with membrane filtration done at one stage or alternatively using several filtration stages (membranes) in series,
   recovering the concentrated lignin, and
   recovering and/or recycling sodium and other side products.

Figure 6:
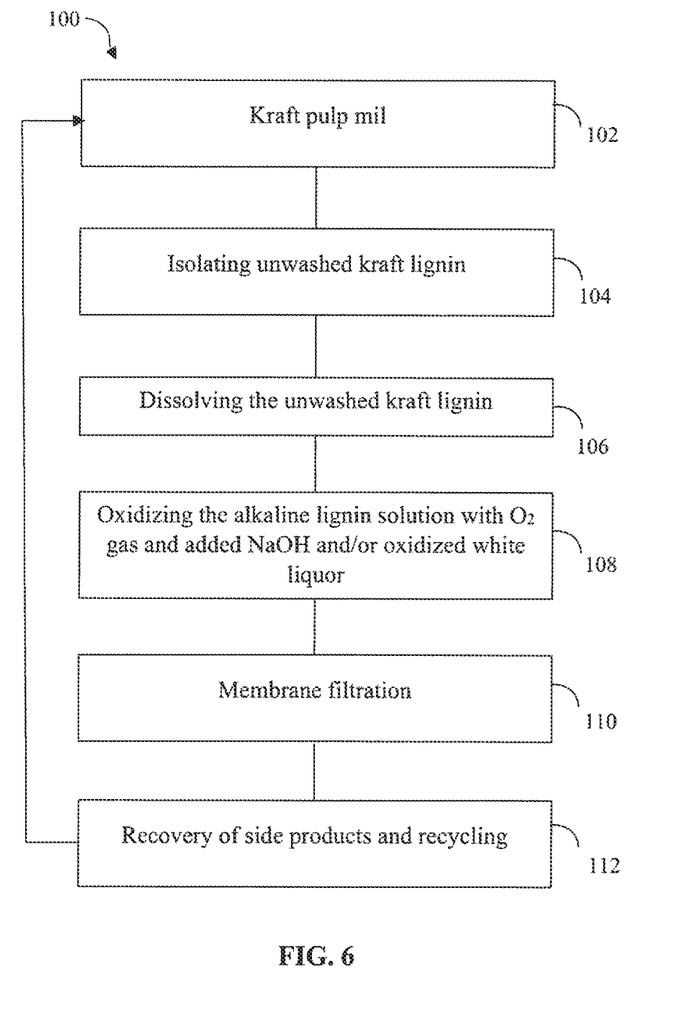
FIG. 6 is a schematic diagram showing a method for producing oxidized lignin in a kraft pulp mill in accordance with an aspect of the present invention.

In accordance with another aspect, there is shown in FIG. 6, a method 100 for producing oxidized lignin in a kraft pulp mill (shown as 102). The method 100 comprises step 104 of isolating unwashed kraft lignin from the kraft pulp mill; step 106 of dissolving the unwashed kraft lignin in oxidized or un-oxidized white liquor to obtain an alkaline lignin solution; step 108 of oxidizing the alkaline lignin solution at alkaline conditions to produce an oxidized lignin with: a) $O_2$ gas over pressure, and b) added NaOH and/or oxidized white liquor; step 110 of treating the oxidized lignin with membrane filtration and recovering a concentrated lignin product; and step 112 recovering at least some side products from the membrane filtration as such and recycling the at least some side products and chemicals back to the kraft pulp mill.

Unwashed lignin means herein a lignin, which is obtained by $CO_2$ precipitation, but which has not been subjected to sulphuric acid washing. High ash content of lignin is not an obstacle to the alkali-$O_2$ oxidation, and thus no acid washing is needed in the present context. Without the washing stage(s), the investment costs of the lignin separation process before the alkali-$O_2$ oxidation stage can be reduced by approximately 40%. Also, the operational costs of lignin separation can be reduced significantly, if washing is not needed for the following alkali-$O_2$ oxidation process. Without washing, also the purge of electrostatic precipitator dust (ESP) from the recovery boiler is lower, having beneficial chemical impacts. In addition, 15% lower alkali consumption is expected in the alkali-$O_2$ oxidation stage.

In a preferred embodiment of the present invention, the $O_2$ gas over pressure is maintained below 30 bars, more preferably below 20 bars, and most suitably below or at about 18 bars. These $O_2$ gas pressures have been found suitable for the desired purpose of lignin oxidation, and allow utilization of the pressure system typically designed for the pulp delignification and thus already available in the kraft pulp mill.

According to a further embodiment of the present invention, the present method includes introduction of hydrogen peroxide as an oxidative agent in combination with above mentioned means a), or a) and b), for oxidizing the formed lignin solution at alkaline conditions.

In one embodiment of the present invention, the oxidized lignin is either ultrafiltrated (UF) or nanofiltrated (NF) at least once with a suitable membrane. UF/NF membrane filtration step can be repeated as many times as required for a desired separation efficiency and concentration of the main lignin product, and improvement of product quality. Herein the main product is thus the concentrated lignin solution, and the side products comprise for example sodium, sulphur and small organic acids, which enter the oxidation process within the unwashed kraft lignin and/or being formed in the oxidation process, not beneficial for the plasticizing purposes. These side products may be either recovered as such or recycled back to the kraft pulp mill. Recycling and/or recovery of the chemicals are essential factors of the present process concept.

In one embodiment of the present invention, the oxidized lignin is acid precipitated and filtered with for example a membrane filter press. Herein the main product is thus the precipitated oxidized lignin, and the side products comprise for example sodium, sulphur and small organic acids, which enter the oxidation process within the unwashed kraft lignin and/or being formed in the oxidation process, not beneficial for the plasticizing purposes. Recycling and/or recovery of the chemicals are essential factors of the present process concept.

According to one embodiment of the present invention, the filtration step(s) increases the oxidized lignin content up to 10-40 wt-% in the product lignin.

According to one embodiment of the present invention, the filtration step(s) increases the oxidized lignin content up to 10-75 wt-% in the product lignin.

Inventors of the present invention have surprisingly discovered, that the method disclosed herein for example
   enables the use of impure i.e. unwashed kraft lignin, which simplifies the kraft lignin isolation process and provides savings in capital and operations costs,
   reduces environmental load due to the decreased $Na_2SO_4$ purge provided by the simplified kraft lignin isolation without introduction of excess sulphur into process,
   reduces the use of alkali in kraft lignin alkali-$O_2$ oxidation process while the lignin stream entering the oxidation is already alkali in nature, having pH>10,
   allows use of oxidized white liquor (OWL) or white liquor (WL) as an alternative alkali source in lignin oxidation process, which reduces the introduction of excess Na into process and provides cost savings. OWL is readily available and currently used in kraft pulp mill for pulp delignification. In addition to hydroxyl ions ($—OH^-$), OWL poses buffering capacity ($CO_3^{2-}$), which is beneficial for the oxidation because it hinders the pH drop and causes lower lignin molar mass when compared to alkali conditions obtained by using only NaOH as an alkali source. Also, the plasticization performance of the lignin product is higher if using OWL, allows utilization of $O_2$ gas from the pressure system designed for the pulp delignification in the mill (additionally $H_2O_2$, which is also already available in the mill, can be used besides $O_2$ at later stage of the oxidation reaction to enhance the anionic charge formation in oxidized lignin), and allows the improvement of product performance and recirculation of chemicals back to the mill through filtration of the oxidized lignin.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The concept described herein provides several (above mentioned) benefits for lignin isolation process, for the following lignin oxidation process, and for the final oxidized lignin product serving as a high-performance concrete plasticizer or dispersant for inorganic (or organic) pigments other than cement or as surface active agent for processes/materials other than aforementioned. In summary, the invention makes production of kraft lignin based plasticizer/dispersant techno-economically feasible within the kraft pulp mill without interfering the process, and providing clear cost and environmental benefits. In addition, production and use of efficient lignin based dispersant opens new business opportunities for companies of the whole value chain—lignin producer/pulp mill, machine suppliers, chemical industry, and dispersant end-users.

Example

Unwashed kraft lignin (alkaline stream, pH<11) obtained from the simplified lignin isolation process is conducted to alkali-$O_2$ oxidation. First, lignin is dissolved in oxidized white liquor (OWL) with or without NaOH in 0.5-40 wt-%, more preferably 5-25 wt-% to obtain a solution with pH 13,0-14,0. Before reacting with $O_2$, temperature of the lignin solution is adjusted to <100° C., most suitably 60-80° C. Lignin oxidation process uses 02 gas from the pressure system of the kraft mill. NaOH or OWL or white liquor (WL) as an alternative alkali source is introduced to the reaction solution during the oxidation. Total effective alkali dose, including OWL, NaOH and WL, is below 65 wt-%, most suitably below 50 wt-% on lignin. Oxidation is done under 02 pressure, at or below 18 bars. $O_2$ can be fed to the reactor during the oxidation reaction period. Examples of compositions of oxidized white liquor (OWL) samples are shown in Table 1.

TABLE 1

| | Effective alkali NaOH g/kg | Total alkali NaOH g/kg | S(tot) g/kg | Carbonate $CO3^{2-3}$ g/kg |
| --- | --- | --- | --- | --- |
| OWL-1 | 75.7 | 95.3 | 27.3 | n.d. |
| OWL-2 | 78.5 | 101 | 29.8 | n.d. |
| OWL-3 | 75.4 | n.d. | n.d. | 14.3 |

Positive effects of the present concept are seen as reduced the purge of the electrostatic precipitator dust (ESP) and demand of make-up NaOH. By use of OWL, also the incoming NaOH can be kept at acceptable level. In addition to effective alkali, oxidized white liquor (OWL) has buffering capacity (carbonate ions). It can be seen that use of OWL is beneficial for oxidation; it hinders the pH drop and causes lower lignin molar mass when compared to alkali conditions obtained by using only NaOH as an alkali source. Thereby, also the plasticization performance of the obtained product is higher if using OWL.

Table 2 shows positive impacts (lower Mw, higher Haegermann flow) if using OWL as part of the alkali (for lignin dissolution prior to oxidation). Oxidation experiments were done by using kraft lignin MF-KL-1. Mortar fluidity was measured by using Haegermann flow table before consolidation. Mortar was prepared by using standard sand, cement (CEM I 42,5N, MH LA SR3 by Cementa Ab) and water (ratios 1:1:0,4). Dosing of commercial reference plasticizers (Pantarhit LK FM, WRDA 90D) and MF-KL-1 based oxidized lignins was 0.20 wt % on cement.

TABLE 2

| | Mw, Da | PD | Alkali used in $O_2$ oxidation |
| --- | --- | --- | --- |
| MF-KL-1 | 3660 | 2.8 | — |
| MF-KL-1-JH1 | 3690 | 2.9 | NaOH |
| MF-KL-1-JH2 | 2990 | 2.7 | OWL + NaOH |

TABLE 2-continued

| Reference plasticizer or oxidized kraft lignin | | Alkali used in $O_2$ oxidation | Haegermann flow value (before consolidation), mm |
|---|---|---|---|
| — | — | — | 117 |
| Pantarhit LK FM | SNF plasticizer | — | 181 |
| WRDA 90D | Lignosulfonate plasticizer | — | 157 |
| MF-KL-1-JH1 | Alkali-$O_2$ oxidized kraft lignin | NaOH | 188 |
| MF-KL-1-JH2 | Alkali-$O_2$ oxidized kraft lignin | OWL + NaOH | 210 |

Table 3 shows positive impacts (lower Mw, higher Haegermann flow) if using OWL as part of the alkali (for lignin dissolution prior to oxidation). Experiments were done by using kraft lignin MF-KL-C24. Mortar fluidity was measured by using Haegermann flow table before consolidation. Mortar was prepared by using standard sand, cement (CEM I 52,5N, Megasementti by Finnsementti) and water (ratios 1:1:0,4). Dosing of commercial reference plasticizers and MF-KL-C24 based oxidized lignins was 0.60 wt-% on cement. Defoamer, tributyl fosfate (TBF) was used in mortar experiments.

means to recover Sodium (Na) and sulphur (S) when conducting the permeate fraction to evaporation followed by Na-recovery process. By membrane concentration the small organic acids (entering the oxidation process within unwashed kraft lignin and/or being formed in the oxidation process), however not beneficial for the dispersing purposes, are separated to the permeate fraction. Concentrated alkali-$O_2$ oxidized lignin solution has shown good plasticizing/dispersing performance in comparison to a synthetic dispersant product. Concentration actually improved the

TABLE 3

| | Mw, Da | PD | Alkali used in $O_2$ oxidation |
|---|---|---|---|
| MF-KL-C24 | 3600 | 2.5 | — |
| MF-KL-C24-JH54 | 5200 | 3.5 | NaOH |
| MF-KL-C24-JH2_6-14 | 3960 | 3.0 | OWL + NaOH |
| MF-KL-C24-JH43 | 5040 | 3.4 | NaOH |
| MF-KL-C24-JH58 | 3980 | 3.0 | OWL + NaOH |
| MF-KL-C24-JH59 | 3530 | 2.8 | OWL + NaOH |
| MF-KL-C24-JH59_2 | 3600 | 2.8 | OWL + NaOH |

| Reference plasticizer or oxidized kraft lignin | | Alkali used in $O_2$ oxidation | Haegermann flow value (before consolidation), mm |
|---|---|---|---|
| — | — | — | 100 |
| Pantarhit LK FM | SNF plasticizer | — | 184 |
| MF-KL-C24-JH54 | Alkali-$O_2$ oxidized kraft lignin | NaOH | 210 |
| MF-KL-C24-JH2_6-14 | Alkali-$O_2$ oxidized kraft lignin | OWL + NaOH | 300 |
| MF-KL-C24-JH43 | Alkali-$O_2$ oxidized kraft lignin | NaOH | 198 |
| MF-KL-C24-JH58 | Alkali-$O_2$ oxidized kraft lignin | OWL + NaOH | 270 |
| MF-KL-C24-JH59 | Alkali-$O_2$ oxidized kraft lignin | OWL + NaOH | 270 |
| MF-KL-C24-JH59_2 | Alkali-$O_2$ oxidized kraft lignin | OWL + NaOH | 300 |

Table 4 shows Haegermann flow values of mortar plasticized by using oxidized lignin (MF-KL-1-JH1) or concentrated fractions thereof. Mortar was prepared by using standard sand, cement (CEM I 52,5N, Megasementti by Finnsementti) and water (ratios 1:1:0,4). Dosing on cement was 0.6 wt-% (based on UV280 lignin content). Defoamer, tributyl fosfate (TBF) was used in mortar experiments.

performance as concrete plasticizer by removal of small molecular acids, which may have disadvantages on hydration kinetics.

The performance of oxidized lignins was also tested in concrete. Oxidized lignin solution as such and after membrane concentration (Membrane filtrated Oxidized lignin)

TABLE 4

| MF-KL-1-JH1 | Mass % | UV lignin g/kg | UV-lignin % | Haegermann flow value (before consolidation), mm |
|---|---|---|---|---|
| Feed | 100% | 102.0 | 100% | 295 |
| 1st Concentrate | | 203.4 | | 280 |
| 2nd Concentrate | | 32.9 | | — |
| 2nd Permeate | 46% | 16.1 | 7% | — |
| 1 + 2 Concentrate | 54% | 156.7 | 84% | 290 |
| Σ(concentrate&permeate) | | | 91% | |

Figure 1:
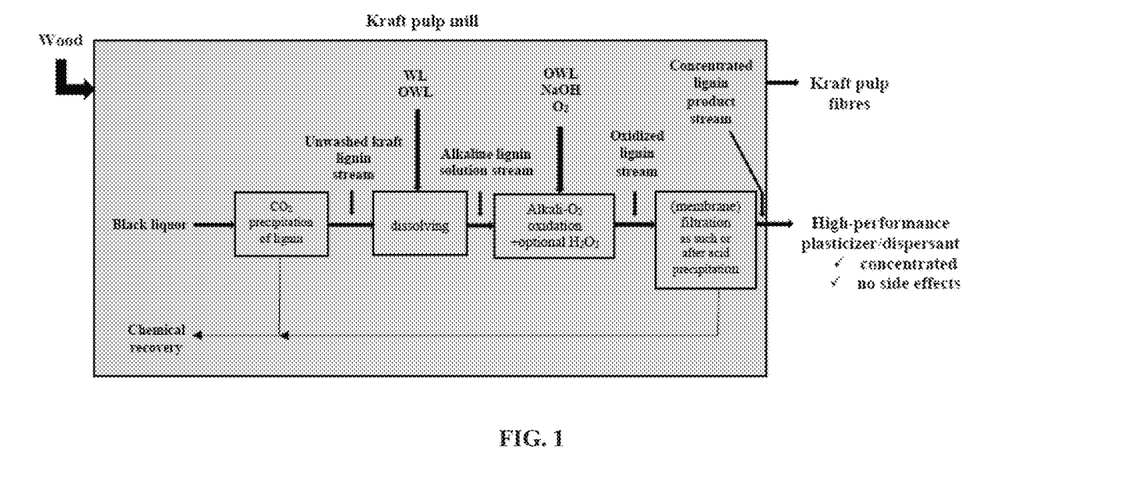
FIG. 1 is a process scheme illustrating combined lignin isolation, alkali-$O_2$ oxidation and filtration of oxidized lignin in kraft pulp mill.
Figure 2:
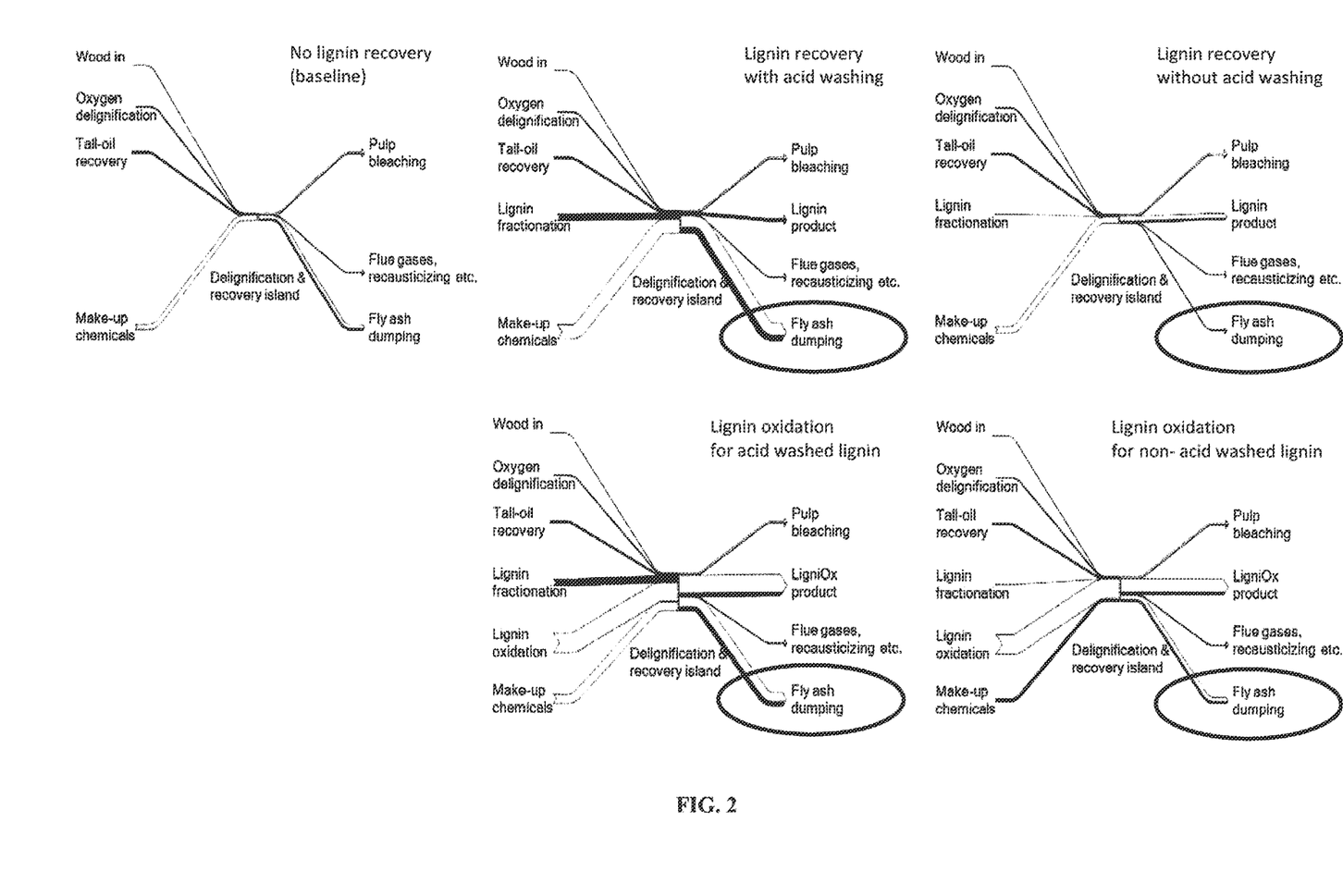
FIG. 2 describes sodium and sulfur balances of reference softwood kraft pulp mill and different lignin recovery and oxidation options.
Figure 3:
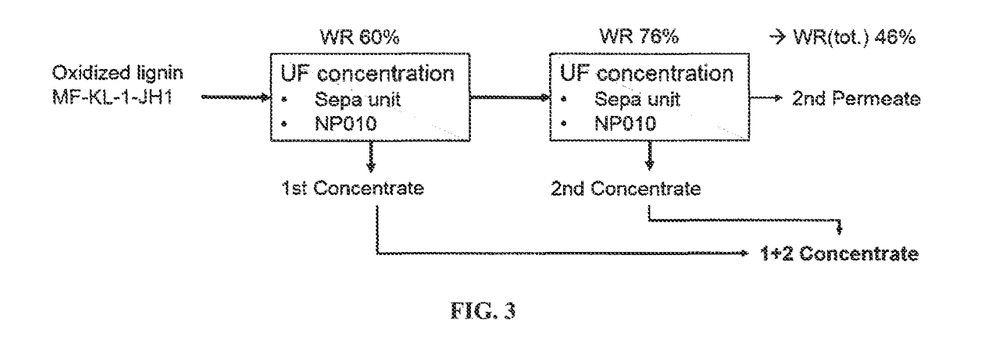
FIG. 3 is a scheme illustrating 2-stage membrane filtration of oxidized lignin solution by using polymeric membrane NP010 (by Microdyn Nadir). Sepa unit is a laboratory scale filtration device with flat frame membranes.
Figure 4:
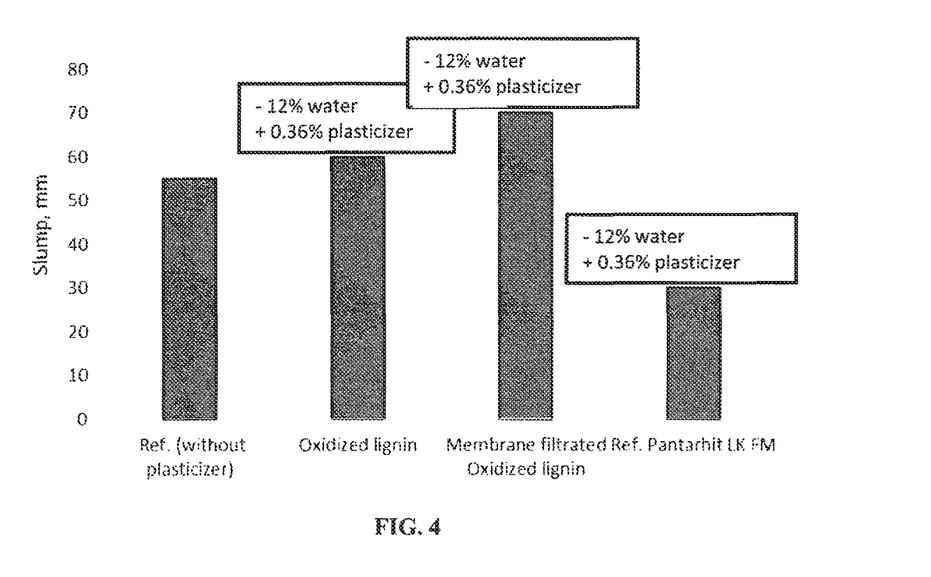
FIG. 4 is diagram showing the importance of filtration for the plasticizing performance i.e. improvement of plasticizing efficiency in concrete based on slump measurements of fresh concrete.

Post-treatment of the oxidized unwashed kraft lignin solution was carried out by membrane filtration (for example 1-2 stages). Concentration increased lignin content to 10-40 wt-% in the product solution and simultaneously provided enabled 12% water reduction in concrete while testing according to a superplasticizer standard (SFS-EN 934-2). Cement quality CEM I 52.5 (Megasementti) was used in preparing the concrete mix. Plasticizer dosing was 0,36% on cement. Concentration improves the plasticizing efficiency in concrete based on the slump measurements of fresh concrete (see FIG. 4).

Figure 5:
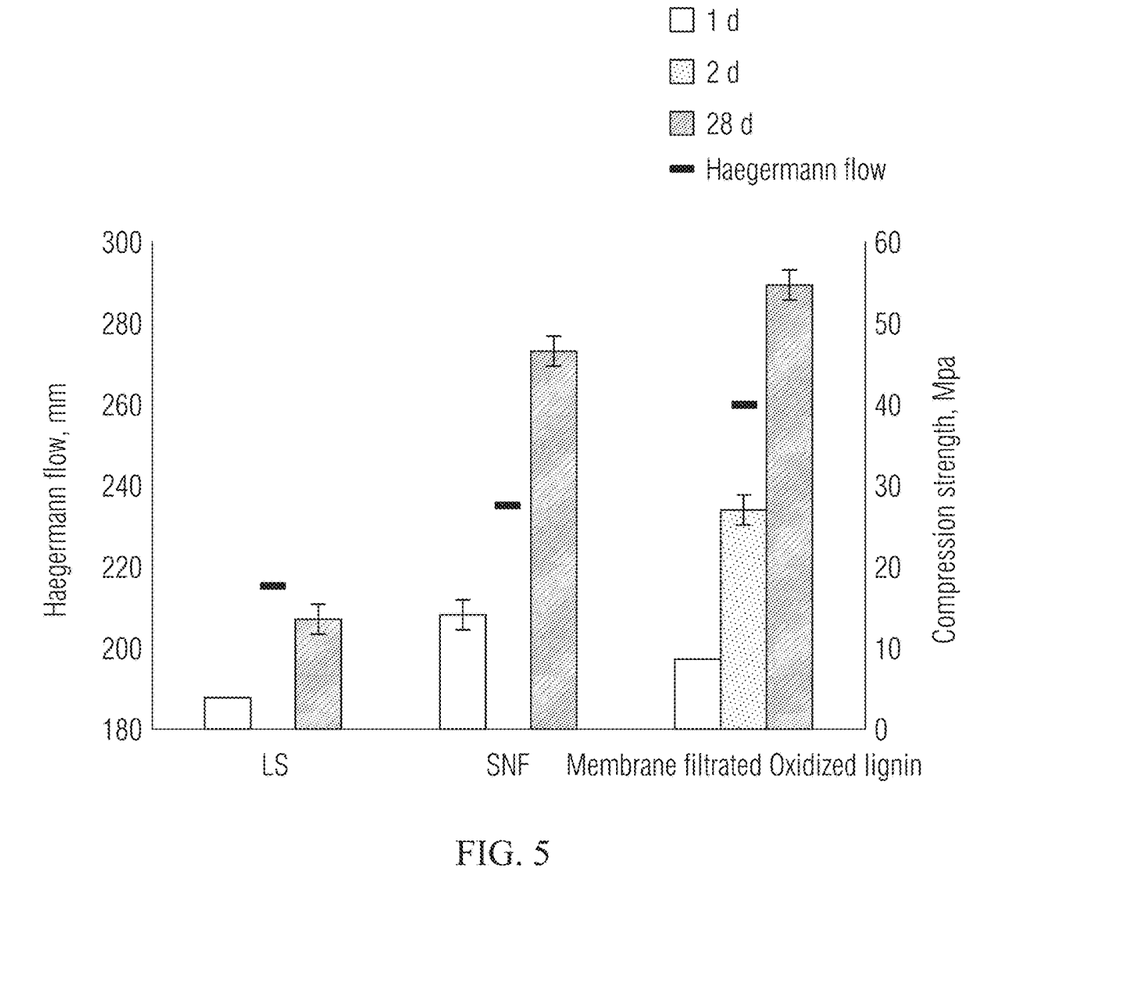
FIG. 5 is a diagram showing Haegerman flow and compression strength values after acid precipitation and membrane filtration (Mortar: Standard sand, CEM I 52,5N, $H_2O$ (w/c 0,5), Plasticizer: 0,30% on cement, Flow value: after consolidation. LS=lignosulfonate, SNF=Pantarhit LK FM. 2d compression strength not measured in the case of reference plasticizers (LS, SNF)).

Oxidized lignin can alternatively be concentrated using membrane filtration after being acid precipitated using e.g. $H_2SO_4$. After membrane filtration of this acidic slurry, the lignin content of the plasticizer product can be as high as 75 wt-%. Oxidized lignin, which is membrane filtered as such or after acid precipitation, provides high plasticization performance in mortar/concrete with acceptable strength development in comparison to commercial plasticized admixtures (see FIG. 5).

CITATION LIST

Patent Literature

WO 2015/049424 A1
WO 2017/077198 A1

The invention claimed is:

1. A method for producing oxidized lignin in a kraft pulp mill comprising at least the steps of:
    isolating unwashed kraft lignin from the kraft pulp mill,
    dissolving the unwashed kraft lignin in oxidized or unoxidized white liquor to obtain an alkaline lignin solution,
    oxidizing the alkaline lignin solution at alkaline conditions to produce an oxidized lignin with:
        a) $O_2$ gas over pressure, and
        b) added NaOH and/or oxidized white liquor,
    treating the oxidized lignin with membrane filtration and recovering a concentrated lignin product, and
    recovering at least some side products from the membrane filtration as such and recycling the at least some side products and chemicals back to the kraft pulp mill.

2. The method according to claim 1, further comprising introducing hydrogen peroxide as an oxidative agent during the oxidizing of the lignin solution in combination with a) or a) and b) for oxidizing the lignin solution.

3. The method according to claim 1, wherein the $O_2$ gas atmospheric pressure is maintained below 30 bars.

4. The method according to claim 1, wherein the oxidized lignin is acid precipitated prior to the membrane filtration.

5. The method according to claim 1, wherein the filtration increases the lignin content at least to 10 wt-% in the concentrated lignin product.

6. The method according to claim 1, wherein the unwashed kraft lignin is dissolved in oxidized white liquor (OWL) having an unwashed kraft lignin content of 0.5-40 wt-%.

7. The method according to claim 1, further comprising producing kraft lignin based surface active agents from the concentrated lignin product.

8. The method according to claim 1, wherein the $O_2$ gas atmospheric pressure is maintained below 20 bars during the oxidizing step.

9. The method according to claim 1, wherein the $O_2$ gas atmospheric pressure is maintained below or at about 18 bars during the oxidizing step.

10. The method according to claim 1, wherein the filtration increases the lignin content to 10-40 wt-% in the concentrated lignin product.

11. The method according to claim 1, wherein the filtration increases the lignin content to 10-75 wt-% in the concentrated lignin product.

12. The method according to claim 1, wherein the unwashed kraft lignin is dissolved in oxidized white liquor (OWL) having an unwashed kraft lignin content of 5-25 wt-%.

13. The method according to claim 1, wherein the membrane filtration is ultrafiltration or nanofiltration.

14. The method according to claim 1, wherein the membrane filtration comprises a plurality of filtration steps, and wherein the plurality of filtration steps are repeated multiple times.

15. The method according to claim 1, wherein the side products from the membrane filtration comprise sodium, sulphur, and small organic acids.

* * * * *